United States Patent

[11] 3,568,075

[72] Inventors George J. Dusheck, Jr.
Cinnaminson, N.J.;
Thomas P. Kelley, Cornwells Heights, Pa.;
Phillips B. Scott, Haddonfield, N.J.
[21] Appl. No. 788,809
[22] Filed Jan. 3, 1969
[45] Patented Mar. 2, 1971
[73] Assignee the United States of America as represented by the Secretary of the Navy

[54] FEATURE ABSTRACTOR
8 Claims, 7 Drawing Figs.
[52] U.S. Cl. .................................................. 328/146,
179/1, 307/201, 324/77
[51] Int. Cl. ...................................................... G01r 23/00
[50] Field of Search .......................................... 324/77 (E);
307/201; 179/1 (AS); 328/146

[56] References Cited
UNITED STATES PATENTS
3,246,302 4/1966 Martin et al. ................. 307/201X Primary Examiner—Rodney D. Bennett, Jr.
Assistant Examiner—Daniel C. Kaufman
Attorneys—Edgar J. Brower and Henry Hansen ABSTRACT: A feature abstractor producing an output signal indicative of the amplitude slope of sequentially sampled amplitude-time-frequency domain signals. This is obtained by taking the differences between successive pulses and applying such differences to the inputs of neuron gates. The neuron gates detect when two successive pulses are of the same polarity and provide an output indicative of the lesser of the two successive pulses.

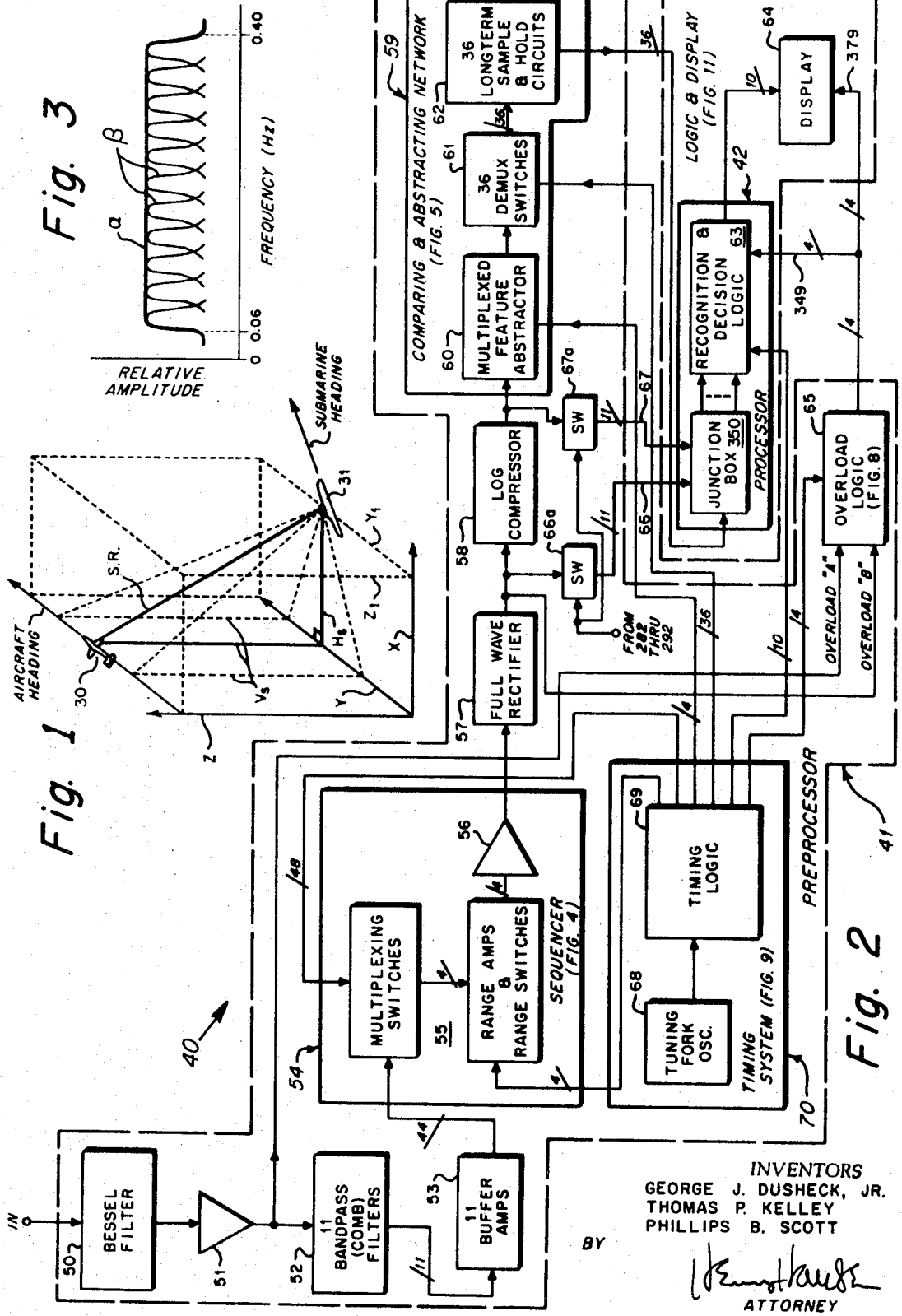

FEATURE ABSTRACTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a feature abstractor for use in a feature recognition system which processes transient submarine signals occurring in the presence of signallike noise and which further recognizes certain relatively invariant features exhibited by the submarine signals and not by the noise signals.

In the field of submarine detection and recognition, magnetic anomaly detection (MAD) devices and techniques have long been utilized. Basically, MAD is an airborne system employing magnetometer elements which sense the presence of a submerged submarine by measuring the small distortion in the earth's magnetic field caused thereby. This technique is an exacting one as the earth's magnetic field intensity may be on the order of 10,000 times stronger than that of the submarine. Additionally, the high altitudes of the aircraft, or more exactly the long slant ranges to the submarine, cause the signals from the submarine to virtually disappear into the noise background. This noise is derived from a multiplicity of sources as from, for example, the magnetometer sensing element itself, the magnetic and electrical equipments of the aircraft, large magnetic fields external to the aircraft such as geologic mineral deposits beneath the ocean floor, and other phenomena.

Due to these many noise sources and the distance between sensor and submarine, the submarine signal is either completely disguised by the noise such that it cannot be recognized therefrom or the noise signals themselves produce a response similar to the submarine signals such that false recognitions are effectuated.

Prior art systems incorporated a trained human operator who memorized features or patterns known to be representative of the signature of a submarine and whose function it was to visually recognize and extract these submarine signals from data displayed before him. The accuracy of such a technique was relatively low and varied with the individual operator. In addition, all of the operators fatigued with time thus further decreasing accuracy. The result was that many false alarms were indicated and many actual targets were entirely missed.

Thus there arose a need for a system capable of automatically and electronically recognizing and detecting, with a high degree of accuracy and reliability, submarine signals occurring in the presence of signallike noise.

SUMMARY OF THE INVENTION

Accordingly, it is the general purpose of the present invention to provide a feature abstractor for use in a feature recognition system which fulfills the need for a highly accurate, fully automatic submarine detection system. The feature recognition system operates upon incoming MAD signals containing both submarine signals and signallike noise, by abstracting the primary feature or positive and negative slopes thereof by means of the feature abstraction, and by utilizing and processing these primary features to recognize and detect relatively invariant submarine signals therefrom.

The feature recognition system is divided into two major functional areas, the preprocessor system and the processor or signal recognition and detection system. The feature abstractor is utilized within the preprocessor. The preprocessor receives MAD amplitude-time domain information (i.e., varying amplitude signals in the time domain) and passes them through a plurality of filter channels each having a different bandwidth and center frequency to provide time waveforms in the amplitude-time-frequency domain (i.e., signals varying in both amplitude and frequency but having the same time base as the received MAD signals). Thereafter, portions of the preprocessor prepares the amplitude-time-frequency domain primary signals for (slope) feature abstraction and supply it to the feature abstractor which actually performs the feature abstraction operation. The processor receives the primary feature abstracted signals and detects and recognizes therefrom the relative presence of invariant submarine signals or features as a function of degree of probability of detection and slant range from airborne feature recognition system to submerged submarine.

More definitively, the preprocessor comprises a plurality of electrical channels each of which includes a comb filter having a predetermined $a$ and passband positioned within the passband of a Bessel filter which receives the raw, input analogue MAD signals from magnetometer sensing elements. The comb filters are connected through buffer amplifiers to the multiplexing sequencer having four operational amplifiers therein of separate predetermined gain, each of which is representative of a range of slant ranges.

Upon passing through each of the four ranges, the MAD signals are combined in a summing amplifier of unity gain, full-wave rectified, and log compressed. Thereafter, the MAD signals are supplied to a feature abstractor which multiplexes the signals obtains signal differences between adjacent comb filter channels and thereby obtains positive and negative slope (primary feature) information. This slope information is supplied to a plurality of demultiplexing switches (which, like many of the other system components, are controlled by timing logic) which feed the information to a like plurality of longterm sample and hold circuits. The information thus derived is fed into the processor along with a portion of the MAD signal tapped off at points before the feature abstractor.

The feature abstractor includes two switches which receive like input information but which are controlled by timing signals so that one switch is open while the other is closed. Connected to the output of each switch is a sample and hold circuit the outputs of which are connected to oppositely polarized inputs of two difference amplifiers. Four switches comprising two switch pairs are provided, one difference amplifier output being connected to a first switch of each switch pair while the other difference amplifier output is connected to the second switch of each pair. The switch outputs are connected to four additional sample and hold circuits two of which are connected to a positive slope abstractor and two of which are connected to a negative slope abstractor. Both abstractors comprise two neuron gates interconnected to provide a minimum difference signal.

Under the control of timing signals, the first two switches permit the passage of information through the first set of sample and hold circuits to the difference amplifiers. These amplifiers take and pass positive differences only. These positive difference signals are then passed through selected ones of the four switches (also under the control of timing signals) to the four remaining sample and hold circuits and from three to the slope abstractors. Upon the occurrence of two sets of positive difference signals at the positive or negative slope abstractors, the neuron gates thereof determine which of the sets is the minimum. This minimum is the primary feature or slope. It will be positive or negative depending upon which of the abstractors passed the information.

BRIEF DESCRIPTION OF THE DRAWING

FIG. 1 is a pictorial representation of a typical search situation;

FIG. 2 is a block diagram of the overall system showing the preprocessor and processor in accordance with the invention;

FIG. 3 is a graph showing the passbands of the Bessel filter and comb filters of FIG. 2;

FIG. 7 is a schematic representation of the positive and negative slope abstractors of the multiplexed feature abstractor of FIG. 5.

DESCRIPTION OF THE PREFERRED EMBODIMENT

Figure 4:
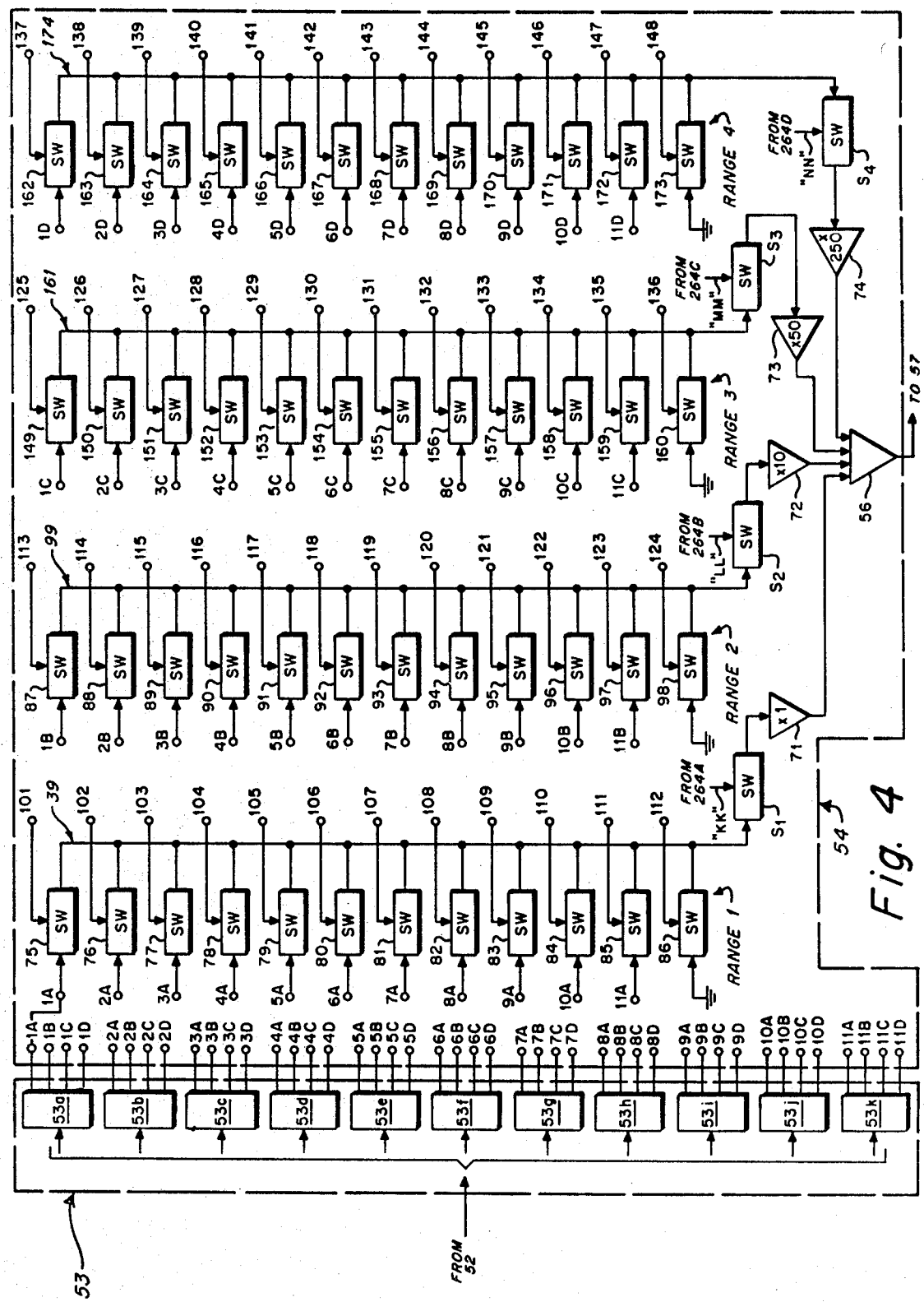
FIG. 4 is a more detailed block diagram of the multiplexing sequencing switches and range amplifiers of FIG. 2.

Referring now to the drawing and more particularly to FIG. 1 thereof, a typical search situation is shown wherein an aircraft 30 (in which is housed the feature recognition system in accordance with the invention) is maneuvering in level flight along a particular heading or aircraft track in search of a submerged submarine 31 moving along its own heading under water. As shown, the XYZ coordinate axes are defined in order that the submarine 31 is positioned and moving within the XY plane. Therefore, the perpendicular distance between the aircraft and submarine lies along the Z axis. This distance is known as the vertical separation and is equal to the sum of the search altitude (the perpendicular distance from aircraft to water surface) and the depth of the submarine. If the aircraft 30 is in straight and level flight and the submarine 31 is moving at a constant depth (as is generally the case) the vertical separation $V_s$ is constant.

As the aircraft flies along its heading there occurs a point at which the distance from the submarine 31 to the projection of the aircraft heading on XY plane is a minimum. This minimum distance is the horizontal separation, $H_s$. At this point the line $H_s$ is perpendicular to the YZ plane (and hence perpendicular to $V_s$). Alternatively stated, $H_s$ is the perpendicular distance between the YZ plane (which contains $V_s$) and a plane $Y_1Z_1$, a plane passed through the submarine 31 and parallel to the plane YZ. With $H_s$ perpendicular to $V_s$ the distance from aircraft to submarine is also minimum. This is called the slant range SR, and is the closest or shortest line of approach.

If, as is generally the case, the submarine 31 is assumed to be a magnetic dipole, then the shape of the anomaly signal therefrom will be a function of the dip angle (position on the earth's surface), the magnetic heading (with respect to magnetic north) of the aircraft, the magnetic heading of the submarine dipole, the horizontal separation of the submarine from the aircraft, and the vertical separation of the submarine from the aircraft. Given these parameters the feature recognition system can detect from amid signallike noise the relative presence of a submerged submarine.

Feature Recognition System

Referring now to FIG. 2 there is shown a feature recognition system 40. The system 40 comprises a preprocessing system 41 and a processing system 42. Magnetic fields (possibly containing a submarine anomaly signal) are sensed by magnetometer elements (not shown), converted to electrical energy, and fed to the preprocessor 41. The preprocessor 41 includes at its input a Bessel filter 50 having a passband of 0.06 Hz to 0.40 Hz. It has been found from prior empirical investigation of accumulated data that most MAD signal energy occurs within this range. This filter thus eliminates that energy below 0.06 Hz and above 0.40 Hz. From the output of the Bessel filter 50 the remaining MAD signal energy is fed to a driver amplifier 51 which may comprise an integrated circuit and which provides isolation between the Bessel filter output and the inputs to 11 band-pass or comb filters 52. Each of these band-pass filters 52 is a narrow, comb filter having a separate center frequency such that each of the respective passbands thereof fits within the passband of the Bessel filter 50 (thus resembling the teeth of a comb). This can be seen in FIG. 3 wherein curve "α" represents the passband of Bessel filter 50 and curve "β" represents the passbands of the respective comb filters 52. The function of the band-pass filters 52 is the break the MAD signal energy down into smaller frequency constituents thereby to facilitate the measurement of energy changes and/or transitions in the frequency domain.

The outputs from each of the 11 band-pass filters 52 are connected to respective buffer amplifiers 53 which function to isolate the filters 52 from a multiplexing sequencer 54, discussed in detail with respect to FIG. 4. Each of the buffer amplifiers 53 has four output terminals. Accordingly, 44 wires lead from the 11 buffer amplifiers 53 (four per amplifier) to a multiplicity of multiplexing switches and range amplifiers 55. These connections will be discussed in detail hereinafter also with respect to FIG. 4. There are four outputs from the multiplexing switches and range amplifiers 55, one output for each of four different ranges. Each of these outputs is fed into a summing amplifier of unity gain 56. The output of the summing amplifier 56 is connected to a full-wave rectifier 57 which, in turn, is connected at its output to a log compressor 58. The log compressor 58 functions to compress the dynamic range of the MAD signal energy to a range sufficiently small such that the electronic equipments of the system can operate within the linear portions thereof. This is necessary because the dynamic range of the input MAD signal energy is excessive (on the order of 80 $db$) and would saturate the electronics if not log compressed. The use of a log compressor also provides a measure of amplitude insensitivity with respect to the features. Full-wave rectifier 57 serves to convert the MAD energy into positive informational energy only so that unipolar networks may be utilized thereafter. The sequencing circuitry 54 permits a multiplexing sequence of 48 sample periods over a range of different gains such that the resultant signals may time share the rectifier 57, log compressor 58, and the other components of the preprocessor 41 and processor 42. The output from the log compressor 58 is fed into a comparing and abstracting network 59, explained in detail with respect to FIG. 5, which includes a multiplexed feature abstractor 60, the output of which is connected to 36 demultiplexing switches 61, which in turn are connected at their respective outputs to 36 long term sample and hold circuits 62, one sample and hold circuit for each of the demultiplexing switches. The comparing and abstracting network 59 operates upon the MAD signal energy to provide analogue primary features thereof. These features are the positive and negative slopes of the energy in each of the adjacent channels for each of the four ranges.

Empirical analysis and testing has shown that if the positive and negative slopes of adjacent channels of the MAD signal energy can be abstracted to obtain primary features, these primary features may be utilized to ascertain the relative presence of invariant submarine features, whereas the features exhibited by the associated noise are entirely random and, therefore, relatively unpredictable and variant. Accordingly, through abstraction of primary feature slope information and the utilization of a probability of occurrence techniques per slant range, the present invention ascertains the presence or absence of a submarine unencumbered by the presence of signallike noise.

The output from the sample and hold circuits 62 is fed to the processor 42 portion of the system. The processor includes a junction box 350 (which serves as a tying and routing point) and plurality of recognition and decision logic networks 63, separate decision logic being used for each of the four amplitude ranges. Each amplitude range is equatable to a range of separations between the search aircraft containing the present invention and the submarine to be detected. More particularly, range 1 corresponds to a slant range of 0 to 600 feet; range 2 corresponds to a 600 to 1,000 foot slant range; range 3 corresponds to a 1,000 to 1,600 foot slant range; and range 4 corresponds to slant ranges greater than 1,600 feet.

The decision logic contains both analogue and digital circuitry which operate upon the analogue primary slope features presented thereto and, if certain probability criteria per amplitude range are met, recognize and detect therefrom invariant submarine features indicative of submarine presence. Upon recognition, the decision logic provides a signal to a display 64. Also connected to the display 64 is an overload logic network 65 which receives overload signal information either from the output of the driver amplifier 51 (overload A) or from the output of pull--wave rectifier 57 (overload B). An overload A signal indicates that range 1 has been overloaded. An overload B signal indicates that either range 2 or 3 or 4 has been overloaded. This will be discussed more fully hereinafter with respect to FIG. 8. The decision logic 63 also receives signal information along lines 66 and 67 (respectively on either side of the log compressor 58). Hence the analogue features operated upon by the decision logic 63 involve not only the previously mentioned primary feature positive and negative channel energy slopes but also some channel energy directly, and some log compressed channel energy. Both the channel energy and log compressed channel energy are taken from range 1 as will be discussed hereinafter. The channel energy is linear and is taken along the line 66 through the switch 66a. The logarithmarized channel energy is taken along the line 67 through the switch 67a As noted heretofore, the information from the 11 band-pass filters 52 is time multiplexed, the multiplexing system consisting of 48 sample periods before the sequence is repeated. The comb filters 52 are sequentially sampled from lowest to highest center frequency with each analogue sample first passed through an amplifier of unity gain. This is range 1. After this initial sampling, the filter outputs are again sampled with the analogue sample voltages multiplied by a gain factor of 10. This is range 2. Ranges 3 and 4 occur when the filter sampling is repeated a third and a fourth time with gains of 50 and 250, respectively. In this way the received MAD amplitude-time information is filtered and sequentially sampled to provide amplitude-time-frequency information.

The timing for the multiplexing and sequencing, the switching of the multiplexed feature abstractor 60 and the demultiplexing switches 61, the decision logic 63, and overload logic 65, is provided from a precision tuning fork oscillator 68 which feeds timing logic 69. The oscillator and timing logic 69 comprise a timing system 70 which will be discussed more fully hereinafter with respect to FIG. 9.

Multiplexing Sequencer

Referring now to FIG. 4 there is shown the multiplexing sequencer 54. The sequencer 54 is fed from the 11 buffer amplifiers 53a—53k, inclusive, each of which is connected to a separate band-pass or comb filter 52. Each of the buffer amplifiers 53 has four outputs, each of which provides an identical output signal. As shown, buffer amplifier 53a has the outputs labeled 1A, 1B, 1C, and 1D. Similarly, amplifier 53b has the outputs 2A, 2B, 2C, and 2D. The remaining buffer amplifiers, namely 53c—53k, inclusive, also each have four output terminals labeled A through D, inclusive, and 3 through 11, inclusive, in the manner analogous to the labeling of the terminals of amplifiers 53a and 53b.

Also shown in FIG. 4 are the four ranges: range 1, range 2, range 3, and range 4 corresponding respectively to the amplifier gains of 1, 10, 50, and 250 for four operational amplifiers 71, 72, 73, and 74 and associated range switches, $S_1$, $S_2$, $S_3$, and $S_4$. It should be noted that more than one operational amplifier may be utilized per range, thus, for example, the amplifier 73 may comprise an amplifier of gain 5 cascaded with an amplifier of gain 10 for linearity purposes. Connected to each of the four amplifiers (through the respective range switches $S_1$—$S_4$ 12 multiplexing switches.

More particularly, the output terminals of switches 75—86, inclusive, are connected together to a common bus 39 which is connected to the input of operational amplifier 71 through range switch $S_1$. Similarly, switches 87—98, inclusive, have their output terminals connected to common bus 99 which, in turn, is connected to the input of operational amplifier 72 through range switch $S_2$. In like manner switches 149—160, inclusive, have their output terminals connected to the common bus 161 which is connected to the input of amplifier 73 (through switch $S_3$) while switches 162—173, inclusive, are connected at their output terminals to the common bus 174 which is connected to amplifier 74 (through switch $S_4$). Each range thus comprises a range switch and 12 additional switches, one switch per range having a grounded input terminal for reasons to be explained during the discussion of the timing system 70. Each of the remaining 11 switches per range has a single input terminal labeled to correspond with a particular output terminal of buffer amplifiers 53a—53k, inclusive. Thus, output terminal 1A of amplifier 53a is connected to input terminal 1A of switch 75. In like manner the remaining connections from buffer amplifier output terminal to like switch input terminal are effectuated. All of the switches to like may be either of the integrated or solid state type and close (a "high" condition) upon the receipt of a control signal and, in the absence thereof, automatically return to the open or low condition. Each of these switches as well as the range switches $S_1$—$S_4$, inclusive, receive a control signal from the timing logic 69. This will be discussed hereinafter with respect to FIG. 9. It is noted here, however, that the range 1 switches receive control signals at terminals 101—112, inclusive; range 2 signals receive control signals at terminals 113—124, inclusive; range 3 switches receive control signals at terminals 125—136, inclusive; and range 4 switches receive signals at terminals 137—148, inclusive.

As noted heretofore the 48 switches provide 48 sample periods, the switches closing sequentially in response to control signals received at terminals 101 through 148, inclusive. Thus, the input MAD signal energy from each of the 11 buffer amplifiers first is fed through switches 75—86, inclusive, in range 1 via lines 1a—11a, inclusive, and out through a unity gain amplifier 71 to the summing amplifier 56. Sequentially, thereafter, range 2 switches are closed to provide this same information from the buffer amplifiers 53 through a gain 10 amplifier 72 to summing amplifier 56. In like manner this same information is sequentially sampled by ranges 3 and 4 and amplified by amplifiers 73 and 74 respectively by a factor of 50 and 250 and fed to summing amplifier 56. After the first 11 of the 12 switches in a given range have closed and then opened, there is a dead time determined by the grounding of the 12th switch, thereby indicating that the MAD energy is being switched from one range to another. All samples thus multiplexed are fed sequentially to the input of full-wave rectifier 57 (FIG. 2).

The sequenced signals appearing at the input of rectifier 57 are full-wave rectified thereby and fed to the multiplex feature abstractor 60 through the log compressor 58. the rectified signals are also fed via the overload B line to overload logic 65. Should an overload signal be present, the logic 65 will detect it and cause it to be displayed as an overload signal on the display 64. This will be discussed more fully hereinafter with respect to FIG. 8. Also, the overload A line will be explained. Additionally, the range information, besides being fed as above indicated, is parallelly fed via the line 66 (through switch 66a) and via the line 67 (through log compressor 58 and switch 67a) to the detection logic 63 of the processor 42. This will be more fully explained hereinafter.

Comparing and Abstracting Network

Figure 5:
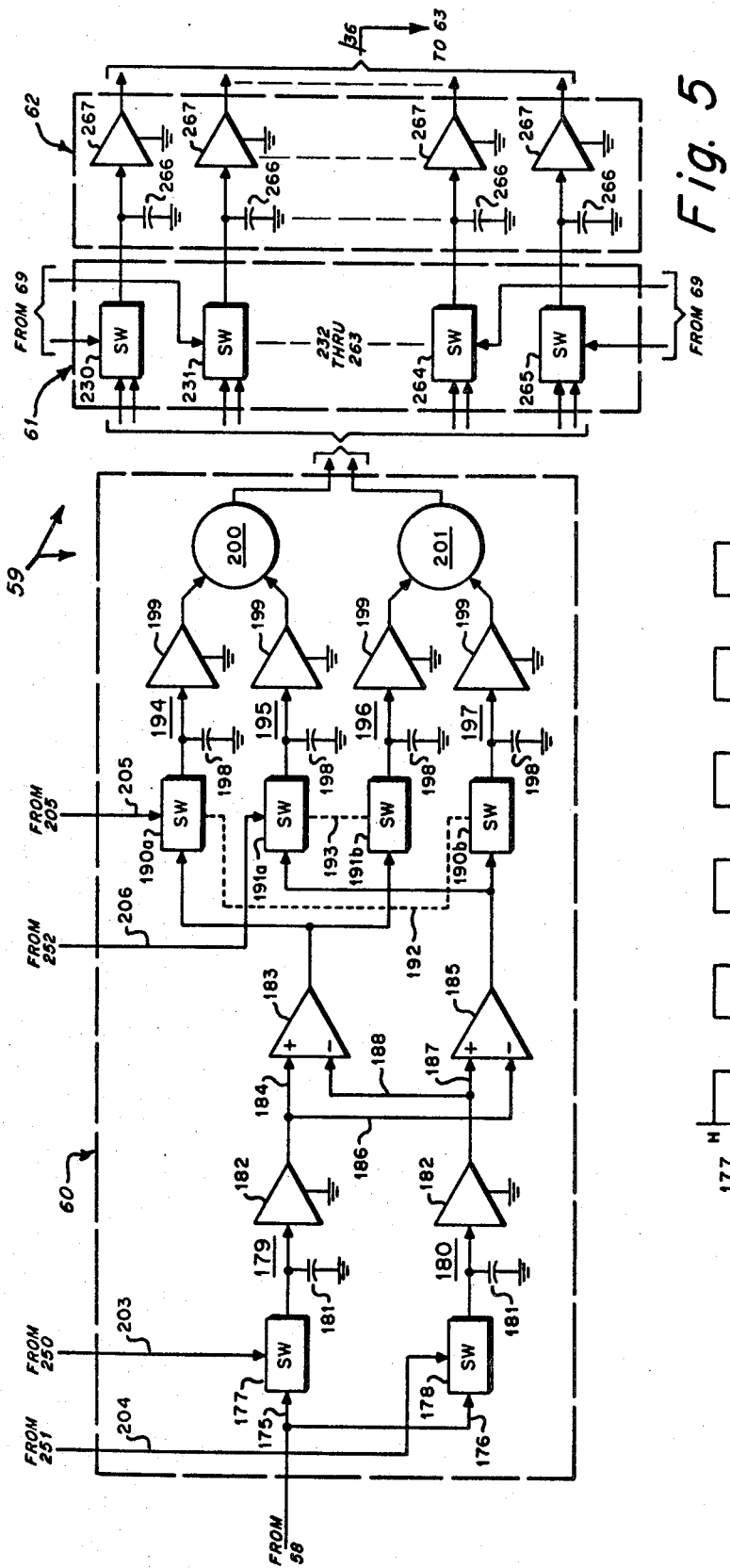
FIG. 5 is a schematic representation of the multiplexed feature abstractor, the demultiplexing switches, and the longterm sample and hold circuits of FIG. 2.

Referring now to FIG. 5, the comparing and abstracting network 59 will be described. This network includes multiplexed feature abstractor 60, demultiplexing switches 61 and long term sample and hold circuits 62, which may include low-pass filters (not shown). The input to the feature abstractor 60 is taken from the log compressor 58 and hence comprises the dynamically range compressed 44 sequenced quanta of MAD signal energy. This energy is fed via lines 175 and 176 to, respectively, switch 177 or switch 178, (switch 177 being open when switch 178 is closed and vice versa as will be discussed hereinafter). The output of each of these switches if respectively connected to separate sample and hold circuits 179 and 189, each of which comprises a grounded polycarbonate capacitor 181 connected at its ungrounded end to a high input impedance operational amplifier 182. Sample and hold circuit 179 is connected to the plus input terminal of a differential amplifier 183 via the line 184 and is further connected to the negative input terminal of a differential amplifier 185 via the line 186. In like manner, sample and hold circuit 180 is connected to the positive terminal of amplifier 185 via line 187 and to the negative terminal of amplifier 183 via line 188. Both amplifier 183 and amplifier 185 are clamped to ground so that they will respond to positive differences only. The reason for this will become clear hereinafter. The output of each of the differential amplifiers 183 and 185 is respectively connected to the inputs of two switches. Amplifier 183 is connected to switches 190a and 191b. Each of these switches are ganged by suitable means (here shown as mechanical linkage 192 and 193) to a respectively indentical switch 190b and 191a. It is to these switches that the output terminal of differential amplifier 185 is connected. The output terminals of each of the switches is connected to a second set of sample and hold circuits comprising again a grounded polycarbonate capacitor and a high input operational amplifier connected as disclosed hereinbefore with respect to circuits 179 and 180. These circuits 194, 195, 196, and 197 include, respectively, capacitors 198 and amplifiers 199. The outputs of sample and hold circuits 194 and 195 are connected to a negative slope abstractor 200, discussed in detail with respect to FIG. 7. In like manner, the outputs of sample and hold circuits 196 and 197 are connected to a positive slope abstractor 201, also discussed with respect to FIG. 7. The outputs both of negative abstractor 200 and positive abstractor 201 are connected to the demultiplexing switches 61.

It should be noted that all of the switches of the abstractor 60 may be either solid state or integrated circuit types or the like. Further, the capacitors 181 and 198 should be of the high precision polycarbonate type. Switches 177, 178, and switch pairs 190a and 190b and 191a and 191b receive timing control signals respectively via lines 203, 204, 205 and 206 from the timing logic 69. This will be more fully disclosed hereinafter.

Figure 6:
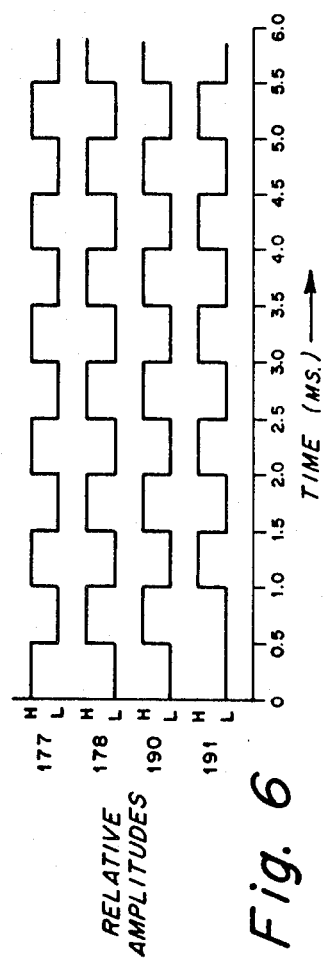
FIG. 6 is a timing diagram for the multiplexed feature abstractor of FIG. 5.

Referring now to FIG. 6 along with FIG. 5, the operation of the multiplexed feature abstractor 60 will be described. FIG. 6 is a timing diagram for the switches 177, 178, the switch pair 190a and 190b shown as 190 and the switch pair 191a and 191b shown as 191. The letters H and L refer respectively to the high or closed condition of the switch and the low or open condition of the switch. The timing pulses are of 500 microseconds duration and are derived from the timing logic 69. The timing of the system is such that when the first, multiplexed quanta of MAD signal energy from channel 1, range 1, arrives at the input of feature abstractor 60, the switch 177 is closed and all other switches remain open. This can be seen from FIG. 6. Accordingly, the quanta of energy is passed through switch 177 and is held on the capacitor 181 of sample and hold circuit 179.

As noted heretofore, differential amplifier 183 responds to positive differences only and it would thus appear that a positive signal at the plus input thereof (i.e., the channel 1, range 1 energy quanta) and no signal at the negative input thereof would allow the amplifier to pass the channel 1, range 1 information through to either switch 190a or 191b. However, as both of these switches are open (the low condition) no signal is passed by differential amplifier 183. After 500 microseconds, switch 177 is open and switch 178 is closed, whereupon channel 2, range 1 information is passed through switch 178 and held by circuit 180. From FIG. 6, it can be seen that in addition to the closing of switch 178, the switch pair 190a and 190b is closed. The closing of switch 178 provides a signal path so that the differential amplifiers 183 and 185 may take positive differences. Thus, the channel 1, range 1 information is applied to the positive terminal of amplifier 183 and the negative terminal of amplifier 185. Concurrently therewith, the channel 2, range 1 information is applied to the negative terminal of amplifier 183 and the positive terminal of amplifier 185. If the channel 1, range 1 information is more positive than the channel 2, range 1 information, the differential amplifier 183 will provide an output indicative of the difference therebetween. Should the converse be true, however, amplifier 185 will take the difference. For purposes of illustration, assume that channel 1, range 1 information is more positive than channel 2, range 1 information. Then amplifier 183 takes the difference therebetween and this information is passed by switch 190a (switch 191b is open) and deposited upon the polycarbonate capacitor 198 of sample and hold circuit 194.

After one millisecond the switch 177 is closed and the third quantum of energy (channel 3, range 1) is fed through the switch 177 and held by circuit 179 at the positive terminal of amplifier 183 and the negative terminal of amplifier 185. These amplifiers now extract the positive difference between channel 3, range 1 information and channel 2, range 1 information, whichever is more positive. For purposes of illustration assume that the energy in channel 2 is more positive than the energy in channel 3. Accordingly, differential amplifier 185 provides a difference signal representative of the positive difference between the two signals to the input terminals of switches 191a and 190b. As can be seen from FIG. 6, however, switch 191 is closed while switch 190 is open. Accordingly, a signal flows through switch 191a and is held by circuit 195. Thus there is now present at the input of negative slope abstractor 200 the positive difference between channels 1 and 2 (as held by circuit 194) and the positive difference between the channels 2 and 3 (as held by circuit 195). The negative slope abstractor 200 determines which of these two differences is the minimum. That is, the negative slope abstractor 200 provides the minimum slope of the negatively feature abstracted signals between adjacent channels. In like manner the positive slope abstractor 201 provides the minimum slope between adjacent channels in the positive sense.

The above assumptions were made to insure a coincidence of inputs at the negative slope abstractor 200. In practice, should a different result have arisen abstractor 200 could not take a difference and would await the occurrence of two inputs thereto. Each of these inputs must be from adjacent channels since the holding circuits store each quantum of information for but one sample period.

Referring now to FIG. 7 negative and positive slope abstractors 200 and 201, respectively, will be explained in detail. Both slope abstractors are unipolar devices known as neuron gates and are somewhat similar to differential amplifiers clamped to ground with an input threshold to be overcome. The output signal from these devices is generally directly proportional to the input signal after overcoming the threshold value and before saturation of the device occurs. As noted heretofore, these devices detect the minimum difference between the energy levels in adjacent channels and, accordingly, may be utilized to determine whether a positive or negative slope is present in each time slot and to indicate the analogue value of the slope, this because the value of a slope at any time in a particular channel is defined as being equal to the smaller of two adjacent channel differences.

Each of the abstractors comprises two neurons. Each neuron, 204, 205, 208, and 209 inclusive, has an excitatory input terminal 212 and an inhibitory input terminal 213. The output of neuron 204 is connected to the inhibitory input of the neuron 205 via line 214. Similarly for the positive abstractor, line 216 connects the output terminal of neuron 208 with the inhibitory input of neuron 209. The excitatory input terminal of neurons 204 and 205 are connected together by line 218. In like manner, line 220, connects the excitatory inputs of neurons 208 and 209. The outputs of neurons 205 and 208 are each connected to the demultiplexing switches 61.

For convenience, the positive difference between the energy in channel 1, range 1 and the energy in channel 2, range 1 being held by circuit 194 has been given the letter designation $a$ and the positive difference between the energy in channel 2, range 1 and channel 3, range 1 being held by circuit 195 has been given the designation $b$. Accordingly, the value $a$ is applied to the excitatory input of neuron 204, while the value $b$ is applied to the inhibitory input of neuron 204. Operationally, these neurons take positive differences by providing an output equal to the excitatory input minus the inhibitory input only if the value on the excitatory input is greater than that on the inhibitory input. In other words and with respect to neuron 204, if $a$ is greater than $b$, $a-b$ appears at the output line 214. Conversely if $b$ is greater than $a$, a zero output will appear on line 214. Since only one of the two cases is possible, it is apparent that either neuron 204 provides the signal $a-b$, or zero. If the signal $a-b$ is provided to the inhibitory input terminal of neuron 205 since the excitatory input terminal thereof has applied thereto the value $a$ the output of neuron 205 will be $a-(a-b)$ or $b$. Similarly if zero is provided to the inhibitory input of neuron 205 and $a$ is provided to the excitatory input thereof, the output will be $a-o$ or $a$. Recalling that $a$ is the positive difference between the energy levels in range 1, channels 1 and 2 and $b$ is the positive difference between the energy levels in range 1, channels 2 and 3, it can be seen that an output of either $a$ or $b$ will respectively be the minimum difference. That is, an output of $a$ indicates that in range 1, channel 1 energy minus channel 2 energy is the more minimum than channel 2 energy minus channel 3 energy, and conversely, an output of $b$ indicates that channel 2 energy minus channel 3 energy is more minimum than channel 1 energy minus channel 2 energy. In this way, primary feature slope abstractions are effectuated.

Below in table I is shown the other possible multiplexed feature abstractor combinations.

TABLE I.—POSSIBLE MULTIPLEX FEATURE ABSTRACTOR COMBINATIONS

| Sample periods: | Timing of switches indicated | | | | Diff amp outputs per sample period | | Neuron inputs per sample period | | | |
|---|---|---|---|---|---|---|---|---|---|---|
| | 177 | 178 | 190 | 191 | 183 | 185 | 194 | 195 | 196 | 197 |
| 1 | H | L | L | L | | | | | | |
| 2 | L | H | H | L | 1-2 | 2-1 | 1-2 | | | 2-1 |
| 3 | H | L | L | H | 3-2 | 2-3 | 1-2 | 2-3 | 3-2 | 2-1 |
| 4 | L | H | H | L | 3-4 | 4-3 | 3-4 | 2-3 | 3-2 | 4-3 |
| 5 | H | L | L | H | 5-4 | 4-5 | 3-4 | 4-5 | 5-4 | 4-3 |
| 6 | L | H | H | L | 5-6 | 6-5 | 5-6 | 4-5 | 5-4 | 6-5 |
| 7 | H | L | L | H | 7-6 | 6-7 | 5-6 | 6-7 | 7-6 | 6-5 |
| 8 | L | H | H | L | 7-8 | 8-7 | 7-9 | 6-7 | 7-8 | 8-7 |
| 9 | H | L | L | H | 9-8 | 8-9 | 7-9 | 8-9 | 9-8 | 8-7 |
| 10 | L | H | H | L | 9-10 | 10-9 | 9-10 | 8-9 | 9-8 | 10-9 |
| 11 | H | L | L | H | 11-10 | 10-11 | 9-10 | 10-11 | 11-10 | 10-9 |
| 12 | L | H | L | L | | | | | | |

This table shows in the first five columns thereof (each vertical alignment data represents a column) substantially the same information as that shown graphically in FIG. 6. Columns 6 and 7 show the possible differential amplifier output differences per sample period while columns 8—11, inclusive, show the possible input signals to neuron gates per sample period. The numbers 1—11, inclusive, in columns 6—11, inclusive, represent the energy levels in the correspondingly numbered channel. Thus, for example, at the end of the second sample period or from FIG. 6 at the expiration of 1 millisecond, switches 177, 178, 190, 191 are positioned such that either differential amplifier 183 or 185 will provide an output signal of respectively 1 minus 2 or 2 minus 1 where, 1 represents the energy level in channel 1, range 1; and 2 represents the energy level in channel 2, range 1. If the output is 1 minus 2, then 1 minus 2 appears at the input of negative slope abstractor 200 from sample and hold circuit 194. Conversely, if 2 minus 1 is the output signal, then this appears at the output of sample and hold circuit 197 to positive slope abstractor 201. In like manner, at the end of the third sample period possible neuron inputs are as shown in the last four columns of Table I.

From FIG. 5 and Table I it can be thus seen that a 1 minus 2 at 194 and a 2 minus 3 at 195 satisfy the two input AND gate condition of negative abstractor 200 thereby allowing the neurons thereof to determine the minimum negative slope. Similarly, 3 minus 2, and 2 minus 1 at the inputs of positive abstractor 201 render it conductive for positive abstraction. Any other combination, as for example 1 minus 2 and 3 minus 2 is ineffective and no slope is abstracted if this sequence occurs. What this means then is that the definition for slope is not satisfied for the quanta of data being examined.

Upon examining Table I it can be seen that no slope abstractions are taken from either channel 1 or channel 11. That is, there is no channel prior to channel 1 or subsequent to channel 11 which may be utilized therewith to extract a minimum difference. This end effect of the abstractor results in only channels 2—10, inclusive, (nine channels in all) being available from which primary feature positive and negative slopes may be abstracted, all channels, however, being utilized in obtaining these slopes.

As only 9 channels provide positive and negative analogue slope feature recognitions, only 36 (9 channels times 4 ranges) demultiplexing switches are required. Each demultiplexing switch 230—265, inclusive, (FIG. 5) is connected at its input terminal to the feature abstractor. Additionally, each demultiplexing switch is connected at its output to longterm sample and hold circuits 62 which comprise 36 polycarbonate capacitors 266 grounded at one terminal thereof and connected at their other terminals to both the output of respective demultiplexing switches 236—265, inclusive, and the input of high impedance operational amplifiers 267. Each of the switches 230—265, inclusive, is connected to timing logic 69 and is controlled thereby in the manner to be hereinafter described. It should be noted that switches 230—265, inclusive, may be solid state switching elements, integrated circuits, or other electronic switches.

Obviously many modifications and variations of the present invention are possible in the light of the above teachings. It is therefore to be understood that within the scope of the appended claims the invention may be practiced otherwise than as specifically described.

We claim:
1. a network receiving sequentially sampled amplitude-time-frequency domain signals for abstracting primary features therefrom comprising:
   first means receiving the sequentially sampled signals for detecting the positive amplitude difference between successive signals and providing output pulses of amplitude indicative thereof; and
   second means receiving said output pulses and passing the lower amplitude pulse of two successive pulses of the same polarity.

2. A network receiving sequentially sampled amplitude-time-frequency domain signals for abstracting primary features therefrom according to claim 1 wherein said first means comprises:
   first and second switch means for alternatively passing said amplitude-time-frequency domain signals in response to control timing signals;
   first and second holding means one each respectively connected to said first and second switch means for alternatively holding the signals passed by said first and second switch means; and
   first and second differential amplifier means one each respectively operatively connected to said first and said second holding means for passing the positive amplitude difference between successively received signals from said first and second holding means.

3. A network receiving sequentially sampled amplitude-time-frequency domain signals for abstracting primary features therefrom according to claim 2 wherein:

said first and said second differential amplifier means each has a positive and a negative input terminal;

said first holding means is connected both to the positive terminal of said first differential amplifier means and the negative terminal of said second differential amplifier means for providing signals thereto; and said second holding means is connected both to the negative terminal of said first differential amplifier means and the positive terminals of said second differential amplifier means for providing signals thereto.

4. A network receiving sequentially sampled amplitude-time-frequency domain signals for abstracting primary features therefrom according to claim 3 wherein:

said first and said second differential amplifier means provide difference signals representative of positive differences between the signals supplied thereto by said first and said second holding means.

5. A network receiving sequentially sampled amplitude-time-frequency domain signals for abstracting primary features therefrom according to claim 4 wherein said second means comprises:

first and second switch pairs, one switch of each switch pair being connected to the output of said first differential amplifier means and the other switch of each switch pair being connected to the output of said second differential amplifier means.

6. A network receiving sequentially sampled amplitude-time-frequency domain signals for abstracting primary features therefrom according to claim 5 wherein:

said first switch pair is closed responsive to control timing signals when said second switch pair is open; and said first switch pair is open when said first switch means is closed and said second switch pair is opened when said second switch means is closed for passing said positive difference signals.

7. A network receiving sequentially sampled amplitude-time-frequency domain signals for abstracting primary features therefrom according to claim 7 wherein said second means further comprises:

a plurality of holding means open each connected to each switch of said pairs of switches for holding said positive difference signals for preselected time periods;

a first abstractor means operatively connected to one switch of each of said switch pairs through a first portion of said plurality of holding means for passing the lower amplitude pulse of two received successive difference signals of the same polarity; and a second abstractor means operatively connected to the other one switch of each of said switch pairs through a second portion of said plurality of holding means for passing the lower amplitude pulse of two received successive difference signals of the same polarity.

8. A network receiving sequentially sampled amplitude-time-frequency domain signals for abstracting primary features therefrom according to claim 7 wherein each of said abstractor means comprises:

a first neuron having a first excitatory input, a first inhibitory input, and an output;

a second neuron having a second excitatory input, a second inhibitory input, and an output;

said first excitatory and inhibitory inputs connected to receive said positive difference signals;

said second excitatory input connected to said first excitatory input to receive a selected one of said positive difference signals;

said second inhibitory input connected to said first neuron output to receive an output signal therefrom indicative of the minimum positive difference between the positive difference signals received by said first neuron; and said second neuron providing at the output thereof said primary features by abstracting the minimum positive difference between said selected positive difference signal on said second excitatory input and the signal on said second inhibitory input.